(12) United States Patent
Cunha et al.

(10) Patent No.: US 11,137,256 B2
(45) Date of Patent: Oct. 5, 2021

(54) PARKING AREA MAP REFINEMENT USING OCCUPANCY BEHAVIOR ANOMALY DETECTOR

(71) Applicant: Robert Bosch GmbH, Stuttgart (DE)

(72) Inventors: Carlos Cunha, Mountain View, CA (US); Ruobing Chen, Mountain View, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 512 days.

(21) Appl. No.: 16/023,104

(22) Filed: Jun. 29, 2018

(65) Prior Publication Data

US 2020/0003565 A1  Jan. 2, 2020

(51) Int. Cl.
| | | |
|---|---|---|
| *G08G 1/14* | (2006.01) | |
| *G01C 21/32* | (2006.01) | |
| *G06K 9/00* | (2006.01) | |
| *G06F 17/18* | (2006.01) | |
| *G01C 21/36* | (2006.01) | |
| *B62D 15/02* | (2006.01) | |

(52) U.S. Cl.
CPC ............ *G01C 21/32* (2013.01); *B62D 15/027* (2013.01); *G01C 21/3685* (2013.01); *G06F 17/18* (2013.01); *G06K 9/00812* (2013.01); *G08G 1/14* (2013.01)

(58) Field of Classification Search
CPC .. G01C 21/32; G01C 21/3685; B62D 15/027; G06F 17/18; G06K 9/00812; G08G 1/14
See application file for complete search history.

(56) References Cited

U.S. PATENT DOCUMENTS

| | | | |
|---|---|---|---|
| 10,354,531 B1* | 7/2019 | Bronder | G08G 1/144 |
| 2013/0013599 A1* | 1/2013 | Lindstrom | G01C 21/32 |
| | | | 707/737 |

(Continued)

FOREIGN PATENT DOCUMENTS

| | | |
|---|---|---|
| DE | 102004062021 A1 | 7/2006 |
| DE | 102008028550 A1 | 12/2009 |

(Continued)

OTHER PUBLICATIONS

Kairoek Choeychuen "Automatic parking lot mapping for available parking space detection" 2013, 5th International conference on Knowledge and Smart Technology, pp. 117-121. (Year: 2013).*

*Primary Examiner* — Mohamed Charioui
*Assistant Examiner* — Christine Y Liao
(74) *Attorney, Agent, or Firm* — Norton Rose Fulbright US LLP; Gerard Messina

(57) ABSTRACT

A method includes receiving data corresponding to detected objects in a parking region, the data including information ascertained by an ascertaining vehicle driving through the parking region, determining a parking region distribution, based on detected objects in a street segment located within the parking region, determining a street segment distribution, calculating a difference between the parking region and the street segment distribution, identifying an anomaly located within the street segment, and generating an updated parking area map of the parking region based on the identified anomaly. The method includes receiving the data, for example, each time an ascertaining vehicle drives through the parking region.

17 Claims, 5 Drawing Sheets

(56) References Cited

U.S. PATENT DOCUMENTS

2014/0340242 A1\* 11/2014 Belzner .................. G08G 1/143
                                                              340/932.2
2017/0131719 A1\* 5/2017 Micks .................. G06K 9/3233

FOREIGN PATENT DOCUMENTS

| DE | 102009028024 A1 | 2/2011 |
| DE | 102013018721 A1 | 6/2014 |
| DE | 102014009627 A1 | 11/2014 |
| WO | WO2012/019628 A1 | 2/2012 |

\* cited by examiner

PARKING AREA MAP REFINEMENT USING OCCUPANCY BEHAVIOR ANOMALY DETECTOR

FIELD OF THE INVENTION

The present invention relates to a method for dynamic refinement of electronic parking area maps by identifying anomalies in parking regions. Further aspects of the present invention relate to a computer program, to a central computer facility, and to a device configured to carry out the method. Subject matter of the present application relates to subject matter in U.S. patent application Ser. No. 15/135,194, filed on Apr. 21, 2016 and issuing on Aug. 29, 2017 as U.S. Pat. No. 9,747,791, the entire content of which is hereby incorporated by reference herein.

BACKGROUND

Open parking areas for vehicles can be detected using distance based sensors (e.g., ultrasonic sensors, laser sensors, radar sensors, stereo video cameras, etc.). Such methods are known for example from DE 10 2004 062 021 A1, DE 10 2009 028 024 A1, and DE 10 2008 028 550 A1.

A variety of driver assistance systems are used in the automotive field, which are intended to assist the driver with carrying out various driving maneuvers. These include, for example, parking assistance systems which, using sensors assigned to the vehicle, detect the surroundings, ascertain possible parking spaces in the surroundings, and assist the driver during parking.

DE 10 2014 009 627 A1 discusses a method for reporting a free parking spot for a vehicle. Free parking spaces are identified using vehicle-internal sensors and based on attributes such as length, width, height, angle, type, and geographical position. A free parking space is also established when a previously occupied parking spot is cleared. Additionally, further sensors can be used to identify traffic signs, for example to consider pieces of information from signage. Moreover, a linkage to a digital road map is additionally provided to preclude the use of areas situated too close to an intersection, for example. Relevant parking spots are reported to other vehicles, with either a direct communication between two vehicles or a central server being used for this purpose.

DE 10 2013 018 721 A1 discusses a method for identifying at least one parking spot for a motor vehicle, the method creating an occupancy grid into which sensor data of at least one distance-measuring sensor are entered. Based on the sensor data, objects are identified and subsequently classified, for example as a car class and as a non-car class. This makes it possible to identify a gated entrance, for example, since generally no parking automobile is identified in the vicinity of such a gated entrance.

WO 2012/019628 A1 discusses a method for identifying parking spaces based on collected GPS data. GPS data of a navigation system are superimposed on a digital map, and clusters that point to possible parking spaces are displayed. Data on the parking space, such as the type of the parking space or the average parking duration, are extracted from the collected data.

SUMMARY

Example embodiments of the present application provide methods and systems to identifying anomalies in a parking region.

According to an example embodiment of the present invention, a method for identifying anomalies in a parking region includes receiving, by processing circuitry, data corresponding to detected objects in a parking region, the data being ascertained by at least one ascertaining vehicle driving through the parking region; determining, by the processing circuitry, a parking region distribution; determining, by the processing circuitry and based on detected objects in a street segment located within the parking region, a street segment distribution; calculating, by the processing circuitry, a difference between the parking region distribution and the street segment distribution; identifying, by the processing circuitry and based on the difference between the parking region distribution and the street segment distribution, an anomaly located within the street segment; and generating, by the processing circuitry, an updated parking area map of the parking region based on the identified anomaly. In an example embodiment, the receiving of the data is performed each time the at least one of the at least one ascertaining vehicle drives through the parking region.

In an example embodiment, the received data includes lengths corresponding to objects detected in the parking region.

In an example embodiment, the received data includes lengths, heights, and widths corresponding to objects detected in the parking region.

In an example embodiment, the method includes dividing the street segment into at least one subsection, and based on detected objects located within the at least one subsection, determining a subsection parking distribution.

In an example embodiment, the method includes calculating a difference between the parking region distribution and the subsection parking distribution.

In an example embodiment, the difference between the parking region distribution and the street segment distribution is calculated using at least one of the following: a Kolmogorov-Smirnov test, a weighted root-mean-square test, a chi-squared test, or any other method for comparing multi-dimensional probability distributions.

In an example embodiment, the difference between the parking region distribution and the subsection parking distribution is calculated using at least one of the following: a Kolmogorov-Smirnov test, a weighted root-mean-square test, a chi-squared test, or any other method for comparing multi-dimensional probability distributions.

In an example embodiment, the method includes determining, based on the difference between the parking region distribution and the subsection parking distribution, that the at least one subsection includes an anomaly.

In an example embodiment, the method includes classifying the parking anomaly as at least one of the following: vegetation, erosion barrier, billboards, construction placards, bus, and delivery vehicle.

In an example embodiment, the street segment distribution is a histogram representing a frequency of lengths of detected objects located within the street segment. In an example embodiment, the street segment distribution is a histogram representing a frequency of heights of detected objects located within the street segment. In an example embodiment, the street segment distribution is a histogram representing a frequency of widths of detected objects located within the street segment. In an example embodiment, the at least one subsection has a length of 5 meters.

Example embodiments of the present invention relate to a server system including a database and a processing unit for identifying an anomaly in a parking region, where the processing unit is configured to receive data corresponding to detected objects in a parking region, the data being ascertained by at least one ascertaining vehicle driving through the street section; determine a parking region distribution; determine, based on detected objects in a street segment located within the parking region, a street segment distribution; calculate a difference between the parking region distribution and the street segment distribution; identify, based on the difference between the parking region distribution and the street segment distribution, an anomaly located within the street segment; and generate an updated parking map of the parking region based on the identified anomaly.

Example embodiments of the present invention relate to a non-transitory computer readable medium on which are stored instructions that are executable by a computer processor and that, when executed by the processor, cause the processor to perform a method, the method including: receiving data corresponding to detected objects in a parking region, the data being ascertained by at least one ascertaining vehicle driving through the parking region; determining a parking region distribution; determining a street segment distribution based on detected objects in a street segment located within the parking region; calculating a difference between the parking region distribution and the street segment distribution; identifying an anomaly located within the street segment based on the difference between the parking region distribution and the street segment distribution; and generating an updated parking area map of the parking region based on the identified anomaly.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention can encompass other equally effective embodiments.

Any embodiment of any of the disclosed compositions and/or methods can consist of, consist essentially of, comprise, include, contain, and/or have any of the described elements and/or features and/or steps.

The use of the word "a" or "an" when used in conjunction with the term "comprising" in the claims and/or the specification can mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features, and advantages of the present invention will become apparent from the following detailed description and the referenced drawings. It should be understood, however, that the detailed description, drawings, and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. However, the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention can be practiced without one or more of the specific details, or with other methods, components, materials, and so forth. For example, well-known structures, materials, or operations are not shown or described in detail to avoid obscuring aspects of the invention.

In an example embodiment, anomalies, which correspond to areas in a parking region in which parking is precluded, are identified, and a parking map of the parking region is updated with the identified anomalies, such that an improved, cleaned up version of the parking map is obtained. In this embodiment, the detection of objects in the parking region or detection of free spaces have an estimated length associated with them.

Figure 1:
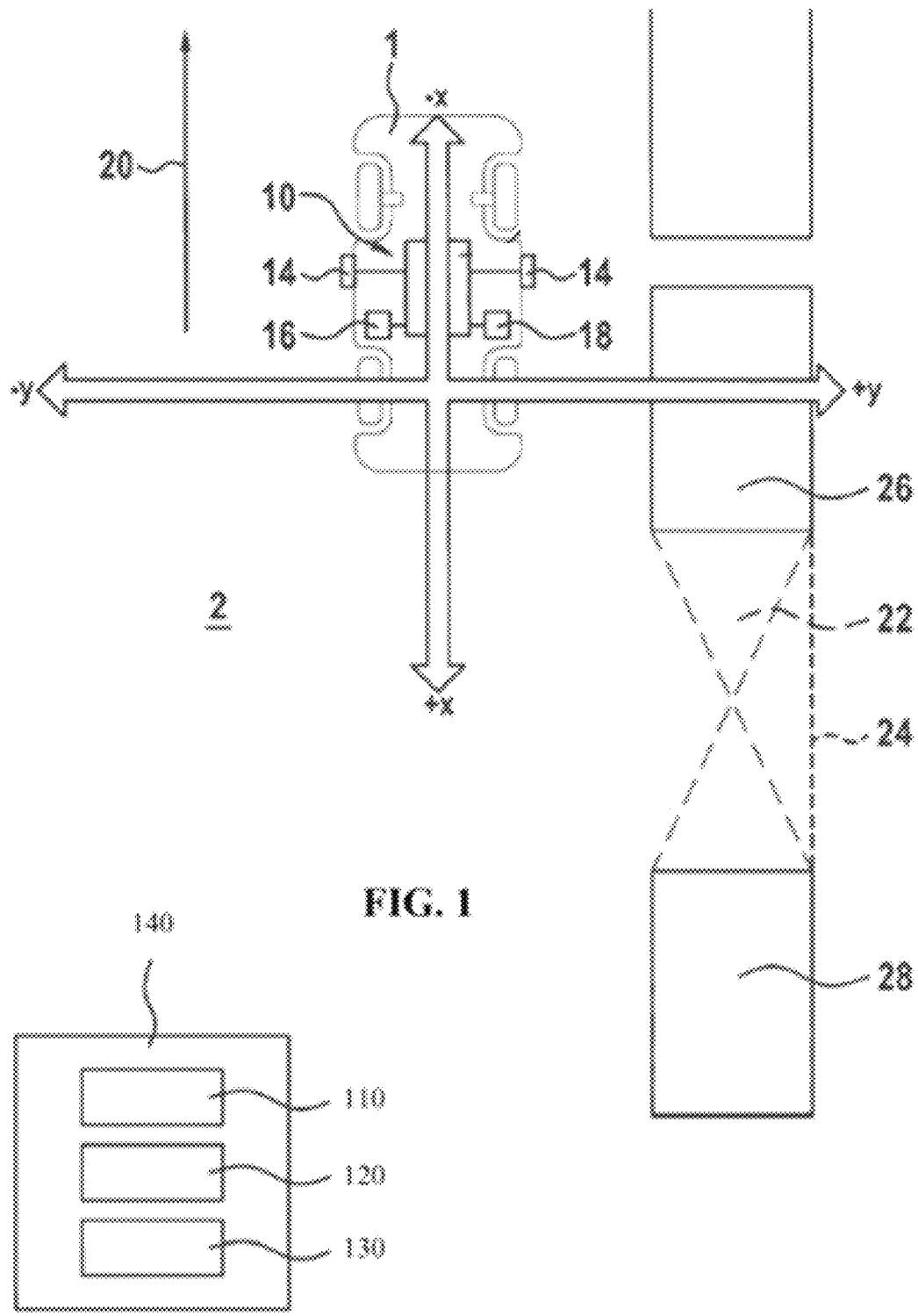
FIG. 1 is a diagram for illustrating object detection by a vehicle according to an example embodiment of the present invention.

FIG. 1 shows ascertaining vehicle 1 that is moving along street 2 in driving direction 20. Ascertaining vehicle 1, includes, for example, device 10 for assisting the driver, which in turn includes surroundings sensors 14 for detecting possible parking spaces 22 in the surroundings of vehicle 1. Surroundings sensors 14 can be, for example in the specific embodiment illustrated in FIG. 1, distance sensors oriented to the sides of vehicle 1, one surroundings sensor 14 each being situated on the left vehicle side and on the right vehicle side. In another example, surroundings sensors can be configured as ultrasonic sensors, laser sensors, radar sensors, or stereo video cameras, etc.

When ascertaining vehicle 1 passes by possible parking space 22, rear delimitation 28, front delimitation 26, and lateral delimitation 24 can be ascertained via surroundings sensors 14. For example, delimitation 28 corresponds to a first reference object, delimitation 26 corresponds to a second reference object, and lateral delimitation 24 corresponds to a lateral reference.

Data corresponding to rear delimitation 28, front delimitation 26, and lateral delimitation 24 can be transmitted together with an indication about its position to a central computer facility 140 via an arrangement for communication 18, e.g., a wireless communication interface. The position of possible parking space 22 can be determined in that initially its position relative to vehicle 1 is ascertained, and additionally the position of vehicle 1 can be determined using satellite navigation. Device 10 can additionally include a GPS receiver 16 for this purpose.

Central computer facility 140 includes an arrangement 110, e.g., a wireless communication interface, for communication for communicating with ascertaining vehicles. The information can be stored in a database 120. Furthermore, a processing unit 130 can be assigned to or included in central computer facility 140.

A typical road segment where parking is allowed is typically occupied by a variety of different vehicles with a variety of different lengths. For example, the average car length in a particular city may be 4.7 meters in length, and the vast majority of vehicles in the particular city may have a length less than 5 meters. Hence, the detection of an object with a length of 6 meters is suspicious, and the more frequently a detection of an object having a length of 6 meters occurs on a particular street segment, relative to other length detections, the more likely this detection is not a parked vehicle. Instead, an object having a length of 6 meters in a particular city where the majority of objects have a length less than 5 meters indicates that the object having a length of 6 meters is in fact an anomaly. An anomaly can be an object that prevents parking of a vehicle, e.g., vegetation, erosion barriers, billboards, construction placards, buses, delivery vehicles, guard rails, trash cans, etc.

Figure 2:
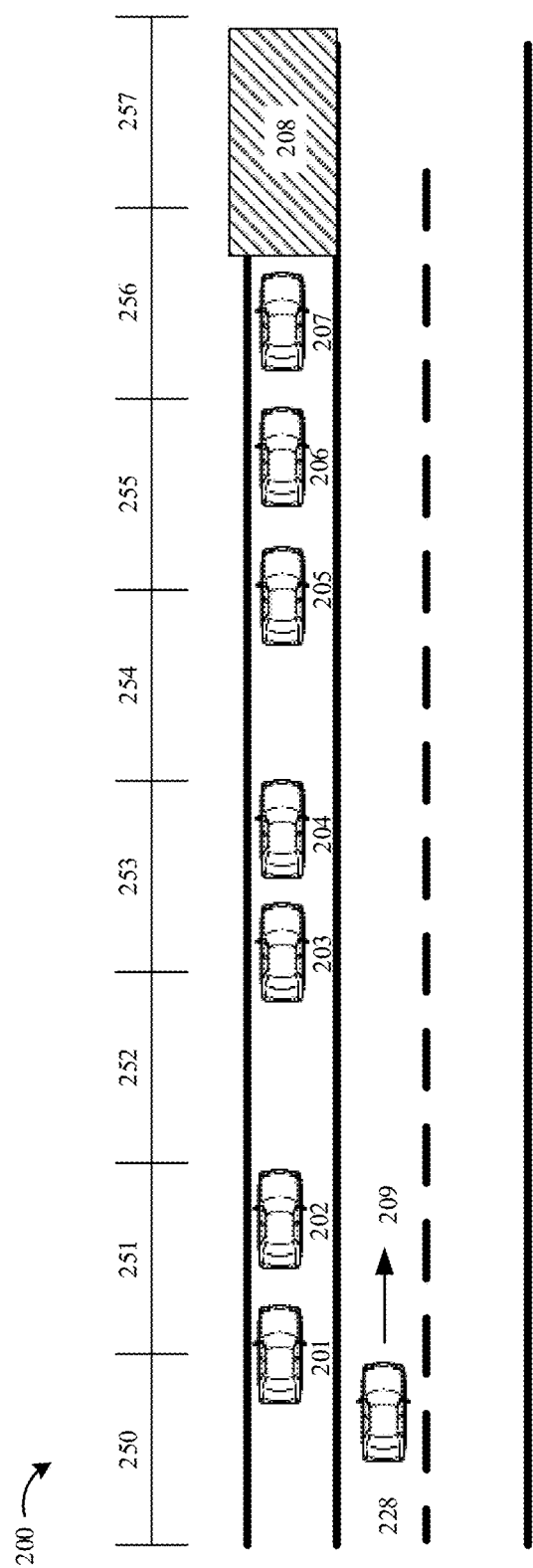
FIG. 2 is a diagram corresponding to a method for identifying anomalies in a parking region according to an example embodiment of the present invention.

Referring now to FIG. 2, street section 200 is shown with vehicles 201, 202, 203, 204, 205, 206, and 207. Street section 200 also includes anomaly 208. Anomaly 208 can be, for example, any one or more of vegetation, erosion barriers, billboards, construction placards, buses, delivery vehicles, guard rails, trash cans, etc.

As ascertaining vehicle 228 drives down street section 200 in direction 209, ascertaining vehicle 228 detects, inter alia, the presence of vehicles 201-207 and anomaly 208. Ascertaining vehicle can detect these objects, for example, using a surroundings sensor, which can be, for example, a distance sensor (e.g., ultrasonic sensors, laser sensors, radar sensors, stereo video cameras, etc.). Data collected by ascertaining vehicle 228 corresponding to the detected objects can be collected and transmitted each time ascertaining vehicle 228 drives down street section 200. The data collected by ascertaining vehicle can correspond to the length, height, width, etc. of vehicles 201-207 and anomaly 208. The collected data can be transmitted to central computer facility 140 shown in FIG. 1.

As depicted in FIG. 2, street section 200 can be divided into subsections 250-257. When ascertaining vehicle 228 travels down street section 200, data corresponding to the length of objects detected within each subsection 250-257 can be detected and transmitted to central computer facility 140 shown in FIG. 1. Alternatively, when ascertaining vehicle 228 travels down street section 200, data corresponding to the length, height, width, etc. of objects detected within each subsection 250-257 can be detected and transmitted to central computer facility 140 shown in FIG. 1. Alternatively, when ascertaining vehicle 228 travels down street section 200, data corresponding the length of objects centered within each subsection 250-257 can be detected and transmitted to central computer facility 140 shown in FIG. 1.

Figure 3:
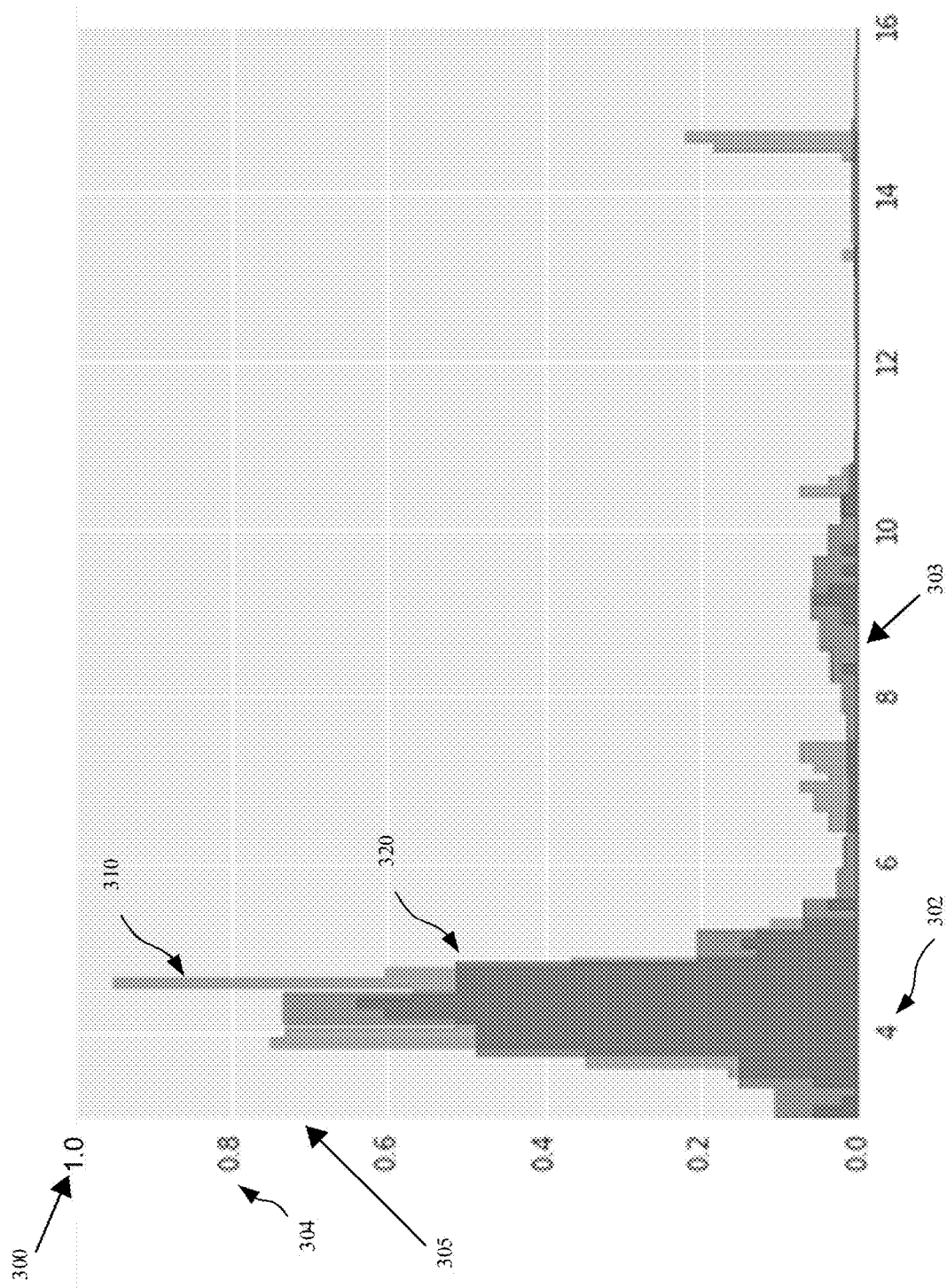
FIG. 3 is a representation of a frequency of detected objects in a parking region according to an example embodiment of the present invention.

Referring to FIG. 3, data corresponding to length of objects detected within a particular subsection are used to establish subsection parking distribution 310 (the light shaded region in the figure). Alternatively, data corresponding to length, width, and/or height of objects detected within a particular subsection are be used to establish a subsection parking distribution. Subsection parking distribution 310 can include, for example, length data 302, represented by horizontal axis 303, and frequency data 304, represented by vertical axis 305. Subsection parking distribution 310 can be in the form of, for example, a histogram. In this manner, subsection parking distribution 310 depicts the length distribution of detected objects centered in a particular subsection of street section 200. As shown in FIG. 3 and as discussed below, subsection parking distribution 310 indicates that its corresponding subsection of a street segment does not include an anomaly.

In addition to street section 200, ascertaining vehicle 228 can drive on additional street sections located within a parking region and transmit data corresponding to objects detected on an additional street section to central computer facility 140 shown in FIG. 1. In general, a parking region refers to any area in which parking is permitted. For example, a parking region can refer to a particular city. Alternatively, a parking region can refer to a particular neighborhood of a city. Alternatively, a parking region can refer to an area delimited by particular streets and/or other boundaries, e.g., a river, landmark, etc. As ascertaining vehicle 228 travels through a parking region, data collected by ascertaining vehicle 228 can include information corresponding to the length, height, width, etc. of each object detected by ascertaining vehicle 228. The information can also be transmitted to computer facility 140 shown in FIG. 1.

Referring to FIG. 3, data corresponding to length of objects detected in the parking region by ascertaining vehicle 228 can be used to establish parking region distribution 320 (the dark shaded region in the figure). Alternatively, data corresponding to length, width, and/or height of objects detected within the parking region can be used to establish a parking region distribution. Parking region distribution 320 includes length data 302, represented by horizontal axis 303, and frequency data 304, represented by vertical axis 305. Parking region distribution 320 can be, for example, a histogram. In this manner, parking region distribution 320 depicts the average length distribution of objects detected in the parking region.

As shown in FIG. 3, parking region distribution 320 and subsection parking distribution 310 can be compared to determine if a particular subsection of street segment 200 includes an anomaly. For example, FIG. 3 illustrates that subsection of street segment corresponding to subsection parking distribution 310 does not include an anomaly, since parking region distribution 310 does not deviate significantly from parking region distribution 320.

Alternatively, a difference between parking region distribution 320 and subsection parking distribution 310 can be calculated, for example, using the following: a Kolmogorov-Smirnov test, a weighted root-mean-square test, a chi-squared test, and/or any other method for comparing multi-dimensional probability distributions.

Figure 4:
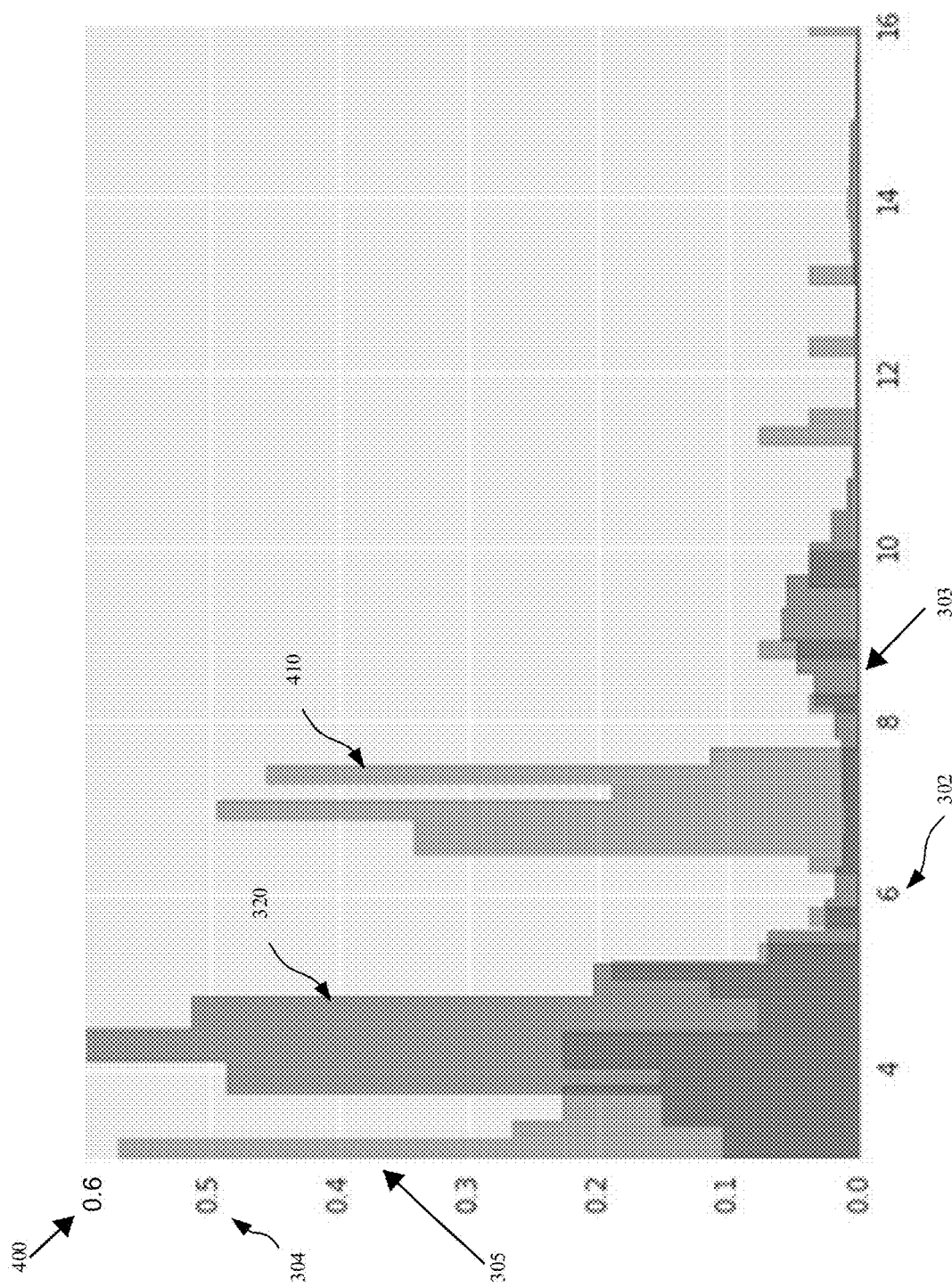
FIG. 4 is a representation of a frequency of detected objects in a parking region according to an example embodiment of the present invention.

In contrast FIG. 4 illustrates a further subsection parking distribution 410 corresponding to a further subsection of street segment that is determined and compared to parking region distribution 320. Further subsection parking distribution 410 is established in an analogous manner to subsection parking distribution 310.

Compared to subsection parking distribution 310, further subsection parking distribution 410 deviates from parking region distribution 320. Based on the comparison between further subsection parking distribution and parking region distribution 320, it can be determined that subsection of street segment corresponding to further subsection parking distribution 410 includes an anomaly. For example, a difference between further subsection parking distribution 410 and parking region distribution 320 can be calculated and compared to a threshold value. For example, if the difference between further subsection parking distribution 410 and parking region distribution 320 is equal to or greater than the threshold value, it can be determined that an anomaly is located in further subsection of street segment. If the difference between further subsection parking distribution 410 and parking region distribution 320 is less than the threshold value, it can be determined that an anomaly is not located in further subsection of street segment.

Thus, according to an example embodiment a distribution of detected object sizes within a particular segment or segment subsection within a parking region is compared to a distribution of object sizes within the parking region as a whole, by which comparison anomalies are detectable within the particular segment or segment subsection, for dynamic update of an electronic parking map.

The determination of whether a subsection parking distribution is anomalous can be done with a wide assortment of statistical techniques aimed at comparing distributions. For example, comparisons can be done using binned and unbinned data, both classes being suitable for comparison purposes. Statistical techniques include, for example, the traditional Kolmogorov-Smirnov test, weighted root-mean-square style statistics such as the chi-squared test, or any other method for comparing multi-dimensional probability distributions. In this manner, the differences between a subsection parking distribution and a parking region distribution can be so pronounced that an anomaly can be detected with very low-number statistics.

In an example embodiment, once it has been determined that a subsection parking distribution is anomalous, a parking map of the parking region is updated. For example, a parking map of the parking region depicts subsections of street segments in the parking region in which parking is allowed. an object that previously been treated as a parked vehicle, resulting in a subsection to be classified as a parking area, but which is then determined to be anomalous, might in fact be something other than a parked vehicle. The previously misclassified object may have been on the surrounding landscape of the street segment, the type of sensor used to detect objects, the settings at which the sensor is set to operate, and processing of the information captured by the sensor.

If a subsection that had been previously identified as including a parking area is determined to include an anomaly, which indicates that an object in the subsection may have been previously misclassified as a parked vehicle, the parking map is updated to remove that subsection so that the parking map includes only subsections in which parking is allowed.

In an example embodiment, a detected anomaly can be classified, for example, based on the length of the detected anomaly. For example, certain types of objects (e.g., vegetation, erosion barriers, billboards, construction placards, buses, delivery vehicles, etc.) have certain lengths associated with them, i.e., a length signature. Based on a comparison between a length of a detected object and a length signature of a known object, an anomaly can be classified.

In an example embodiment, the parking map of the parking region can be updated based on the classification of the anomaly. For example, if an anomaly is classified as a bus, the parking map can be updated to indicate that subsection in which the anomaly was detected includes a bus within it. The parking map can indicate that the anomaly is a bus, for example, by displaying an icon. In an example embodiment, if an anomaly is classified as a construction placard, the parking map can be updated to indicate that the subsection may only include an anomaly temporarily and/or the system, in an example embodiment, updates the map based on the anomaly for a predefined specific amount of time depending on the classification of the object, certain classifications causing the object to be treated as a permanent fixture and others only as temporary.

In an example embodiment, a subsection parking distribution can be established using information other than length. For example, heights of objects can be detected and used to establish a subsection parking distribution. Alternatively, widths of objects can be detected and used to establish a subsection parking distribution. Alternatively, lengths, heights, and widths of objects can be used jointly or separately for establishing a subsection parking distribution and the determination of whether an anomaly exists in the corresponding subsection of the street segment.

Figure 5:
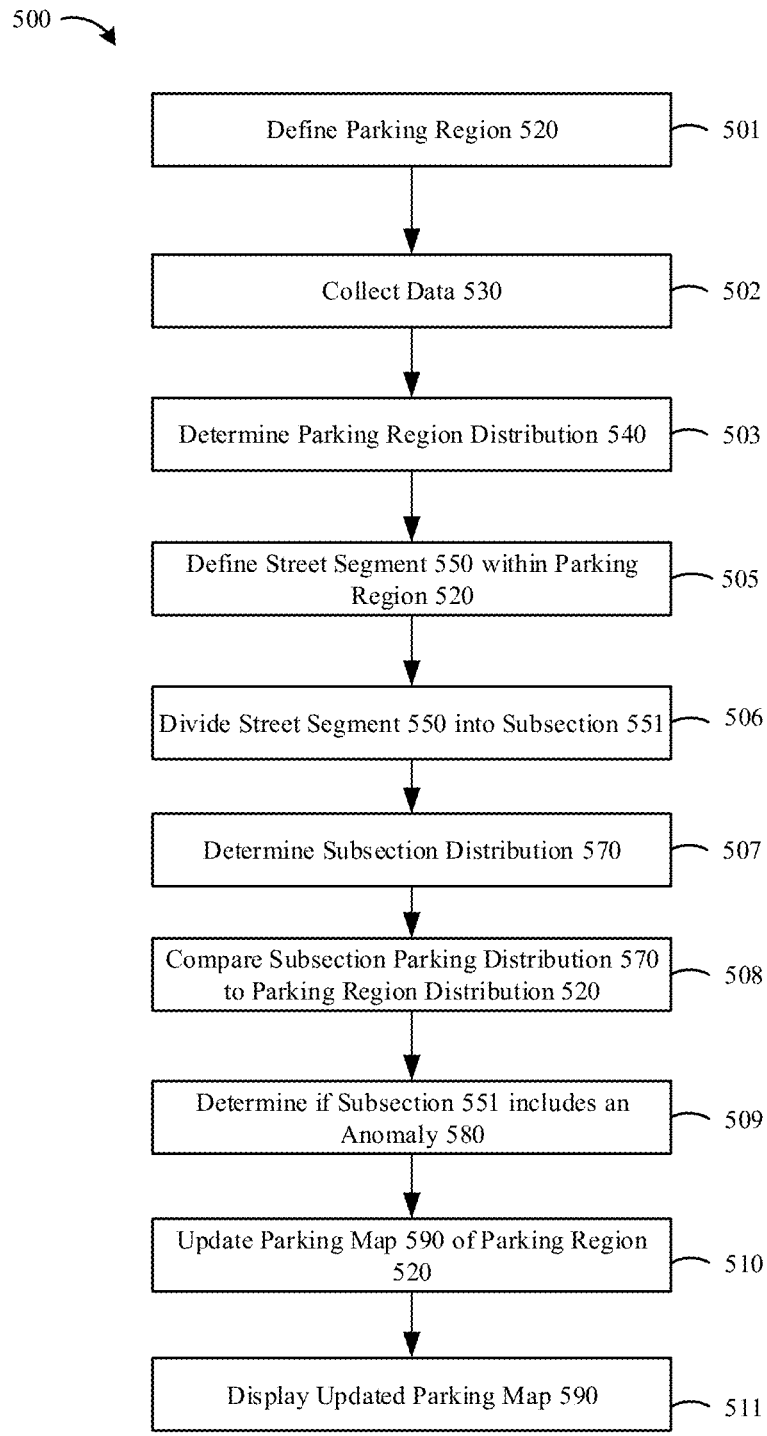
FIG. 5 is a flowchart illustrating a method for identifying anomalies in a parking region according to an example embodiment of the present invention.

FIG. 5 is a flowchart of a method 500 for identifying anomalies in parking regions. At step 501, parking region 520 is defined. Parking region 520 can refer to, for example, a city, a neighborhood within the city, or an area within the city delimited by streets, landmarks, or other boundaries. At step 502, data 530 corresponding to objects detected in parking region 520 is collected over a period of time. Data 530 is collected from various sensors located on vehicles that travel through the parking region and can include information related to, inter alia, lengths of objects, heights of objects, and/or widths of objects. At step 503, parking region distribution 540 is determined based on collected data 530.

Data 530 can be collected from one or more vehicles traveling in the same parking region. In this manner, data is collected over a period of time so as to establish a collection of data over the particular period of time corresponding to the particular parking region.

At step 505, street segment 550 within parking region is defined. At step 506, street segment 550 is divided into at least one subsection 551. At step 507, a subsection parking distribution 570 is established, subsection parking distribution 570 corresponding to objects detected in subsection 551 of street segment 550.

At step 508, subsection parking distribution 570 corresponding to subsection 551 of street section 550 is compared to parking region distribution 520. At step 509, based on the comparison performed in step 508, it is determined if subsection 551 of street section 550 includes anomaly 580. At step 510, based on the determination of anomaly 580, parking map 590 of parking region 520 is updated, and at step 511, updated parking map 590 is displayed using a display device. For example, parking map 590 can be updated by removing subsection 551 (which includes anomaly 580) from parking map 590 as a permissible parking area so that parking map 590 would include only subsections in which no anomaly is detected, i.e., parking map 590 represents only areas in which parking is allowed.

An example embodiment of the present invention is directed to processing circuitry, e.g., including one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a plurality of ascertaining vehicles that detect, and transmit to a server, information concerning lengths of objects detected in a parking region, where the server accumulates the lengths of detected objects and uses the accumulated data to generate an average length distribution of objects detected in the parking region. A plurality of ascertaining vehicles can also detect and transmit to a server, information concerning length of objects detected in a street segment, where the server accumulates the length of detected objects in the street segment and uses the accumulated data to generate an average length distribution of objects detected in the street segment. Using the average length distribution of objects detected in the parking region and the average length distribution of objects detected in the street segment, the server can determine if an anomaly exists in the street segment.

The server can transmit determined anomaly to the plurality of ascertaining vehicles, to a user terminal, for example, a desktop, laptop, hand-held device, Personal Digital Assistant (PDA), television set-top Internet appliance, mobile telephone, smart phone, etc., to an additional server, and/or to additional vehicles. The ascertaining vehicle, user terminal, other vehicles or server can then display the anomaly using a display device.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above specification and examples provide a description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown can include some or all of the features of the depicted embodiment. For example, elements can be omitted or combined as a unitary structure, and/or connections can be substituted. Further, where appropriate, aspects of any of the examples described above can be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not to be interpreted as including means-plus- or step-plus-function limitations, unless such a limitation is explicitly recited in a given claim using the phrase(s) "means for" or "step for," respectively.

What is claimed is:

1. A method for dynamic electronic parking map generation, the method comprising:
   receiving, by processing circuitry and from at least one ascertaining vehicle driving through a parking region, data from at least one sensor of the at least one ascertaining vehicle and corresponding to detected objects in the parking region;
   determining, by the processing circuitry and based on the received data, a parking region distribution of detected objects in the parking region;
   determining, by the processing circuitry and based on the received data, a street segment distribution of detected objects in a street segment located within the parking region;
   determining, by the processing circuitry, a difference between the parking region distribution and the street segment distribution;
   identifying, by the processing circuitry and based on the difference between the parking region distribution and the street segment distribution, an anomaly located within the street segment;
   generating, by the processing circuitry, an updated parking area map of the parking region based on the identified anomaly, and
   dividing the street segment into at least one subsection, wherein the determining of the street segment distribution includes, based on detected objects located within the at least one subsection, determining a subsection parking distribution,
   wherein determining the difference between the parking region distribution and the street segment distribution includes determining a difference between the parking region distribution and the subsection parking distribution,
   wherein the identification of the anomaly includes determining, based on the difference between the parking region distribution and the subsection parking distribution, that the at least one subsection includes the anomaly.

2. The method of claim 1, wherein the receiving of the data is performed each of a plurality of times the at least one of the at least one ascertaining vehicle drives through the parking region.

3. The method of claim 1, wherein the received data includes lengths corresponding to the detected objects that are detected in the parking region.

4. The method of claim 1, wherein the received data includes lengths, heights, and widths corresponding to the detected objects that are detected in the parking region.

5. The method of claim 1, wherein the difference between the parking region distribution and the subsection parking distribution is calculated using at least one of the following: a Kolmogorov-Smirnov test, a weighted root-mean-square test, and a chi-squared test.

6. The method of claim 5, wherein the identification of the anomaly includes determining, based on the difference between the parking region distribution and the subsection parking distribution, that the at least one subsection includes an anomaly.

7. The method of claim 1, further comprising:
classifying the parking anomaly as at least one of the following: vegetation, erosion barrier, billboards, construction placards, bus, and delivery vehicle.

8. The method of claim 1, wherein the street segment distribution is a histogram representing a frequency of lengths of detected objects located within the street segment.

9. The method of claim 1, wherein the street segment distribution is a histogram representing a frequency of heights of detected objects located within the street segment.

10. The method of claim 1, wherein the street segment distribution is a histogram representing a frequency of widths of detected objects located within the street segment.

11. The method of claim 1, wherein the at least one subsection has a length of 5 meters.

12. A system for dynamic electronic parking map generation, the system comprising processing circuitry, wherein the processing circuitry is configured to perform the following:
receive from at least one ascertaining vehicle driving through a parking region, data from at least one sensor of the at least one ascertaining vehicle and corresponding to detected objects in the parking region;
determine based on the received data a parking region distribution of detected objects in the parking region;
determine based on the received data a street segment distribution of detected objects in a street segment located within the parking region;
determine a difference between the parking region distribution and the street segment distribution;
identify based on the difference between the parking region distribution and the street segment distribution, an anomaly located within the street segment;
generate an updated parking map of the parking region based on the identified anomaly, and
divide the street segment into at least one subsection, wherein:
the determination of the street segment distribution includes, based on detected objects located within the at least one subsection, determining a subsection parking distribution; and
the determination of the difference between the parking region distribution and the street segment distribution includes calculating a difference between the parking region distribution and the subsection parking distribution,
wherein an anomaly is identified based on the difference between the parking region distribution and the subsection distribution.

13. The server system of claim 12, wherein the receipt of the data is performed each of a plurality of times the at least one of the at least one ascertaining vehicle drives through the parking region.

14. The server system of claim 12, wherein the received data includes lengths, heights, and widths corresponding to objects detected in the parking region.

15. The server system of claim 12, wherein the difference between the parking region distribution and the subsection parking distribution is calculated using at least one of the following: a Kolmogorov-Smirnov test, a weighted root-mean-square test, and a chi-squared test.

16. The server system of claim 12, wherein the difference between the parking region distribution and the subsection parking distribution is calculated using a multi-dimensional probability distribution comparison.

17. A non-transitory computer-readable medium on which are stored instructions that are executable by a computer processor and that, when executed by the processor, cause the processor to perform to perform a method for dynamic electronic parking map generation, the method comprising:
receiving, from at least one ascertaining vehicle driving through a parking region, data from at least one sensor of the at least one ascertaining vehicle and corresponding to detected objects in the parking region;
determining, based on the received data, a parking region distribution of detected objects in the parking region;
determining, based on the received data, a street segment distribution of detected objects in a street segment located within the parking region;
determining, a difference between the parking region distribution and the street segment distribution;
identifying, based on the difference between the parking region distribution and the street segment distribution, an anomaly located within the street segment;
generating an updated parking area map of the parking region based on the identified anomaly, and
dividing the street segment into at least one subsection, wherein the determining of the street segment distribution includes, based on detected objects located within the at least one subsection, determining a subsection parking distribution,
wherein determining the difference between the parking region distribution and the street segment distribution includes determining a difference between the parking region distribution and the subsection parking distribution,
wherein the identification of the anomaly includes determining, based on the difference between the parking region distribution and the subsection parking distribution, that the at least one subsection includes the anomaly.

* * * * *